(12) United States Patent
Yoshida et al.

(10) Patent No.: US 7,699,623 B2
(45) Date of Patent: Apr. 20, 2010

(54) ELECTRICAL JUNCTION BOX

(75) Inventors: Masaoki Yoshida, Shizuoka (JP); Takuya Nakayama, Shizuoka (JP); Koji Ueyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/153,243

(22) Filed: May 15, 2008

(65) Prior Publication Data

US 2008/0299798 A1 Dec. 4, 2008

(30) Foreign Application Priority Data

May 28, 2007 (JP) ............................. 2007-140327

(51) Int. Cl.
*H01R 12/00* (2006.01)
(52) U.S. Cl. .................. 439/76.2; 174/50; 439/949
(58) Field of Classification Search ............... 439/76.2, 439/76.1, 949; 174/50
See application file for complete search history.

(56) References Cited

U.S. PATENT DOCUMENTS 5,822,189 A * 10/1998 Isshiki ..................... 361/736
6,077,102 A * 6/2000 Borzi et al. ................. 439/364
6,524,136 B2 * 2/2003 Kawaguchi et al. ..... 439/620.26
6,570,088 B1 * 5/2003 Depp et al. ................... 174/50
6,923,660 B2 * 8/2005 Takeuchi ................... 439/76.2
7,465,172 B2 * 12/2008 Ishiguro et al. ............ 439/76.2

FOREIGN PATENT DOCUMENTS

| JP | 2000-102138 | 4/2000 |
| JP | 2002-152943 | 5/2002 |
| JP | 2003-348732 | 12/2003 |
| JP | 2004-328842 | 11/2004 |

* cited by examiner

*Primary Examiner*—Michael C Zarroli
(74) *Attorney, Agent, or Firm*—Edwards Angell Palmer & Dodge LLP

(57) ABSTRACT

An electrical junction box, which is assembled by first inserting a circuit board assembly into a primary housing via an opening of the primary housing, and after that inserting a secondary housing into the primary housing, includes a connector block that has a projection that widens the opening that has been narrowed. A plurality of ribs are formed on front and rear walls of the thin primary housing from the side of the opening in an insertion direction of the circuit board assembly. A concave groove formed between a pair of the projections engages with the rib of the front wall. The ribs on the rear wall are close to a circuit board of the circuit board assembly. The connector block has protuberances that abut against the ribs.

18 Claims, 6 Drawing Sheets

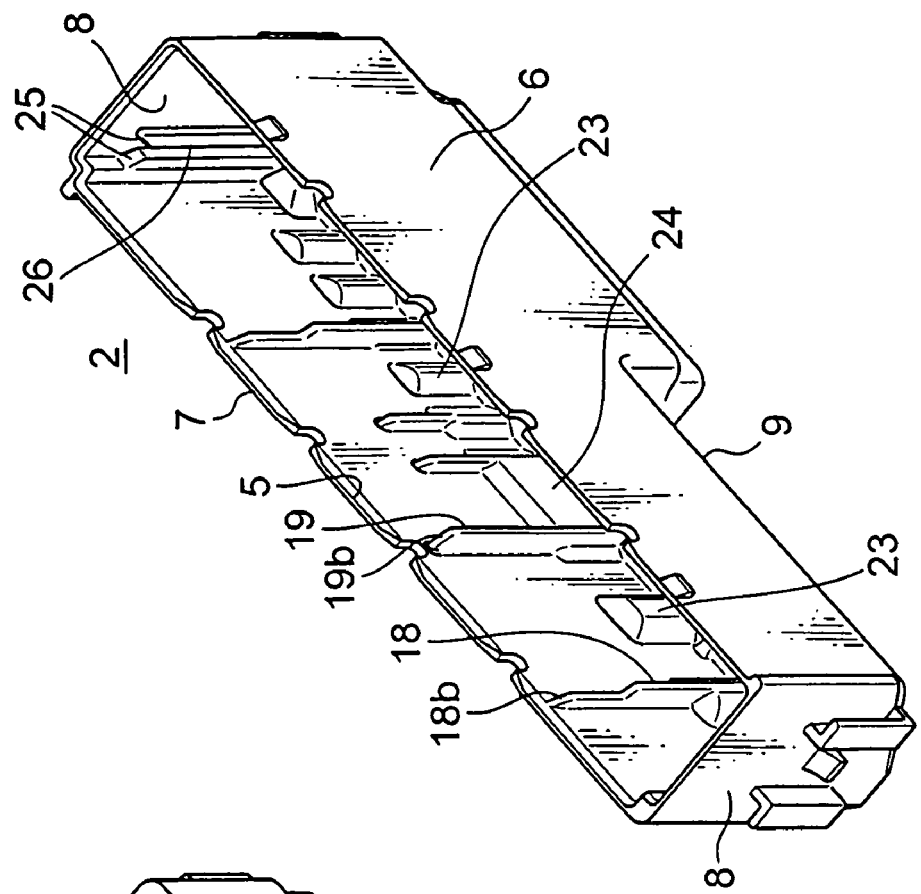
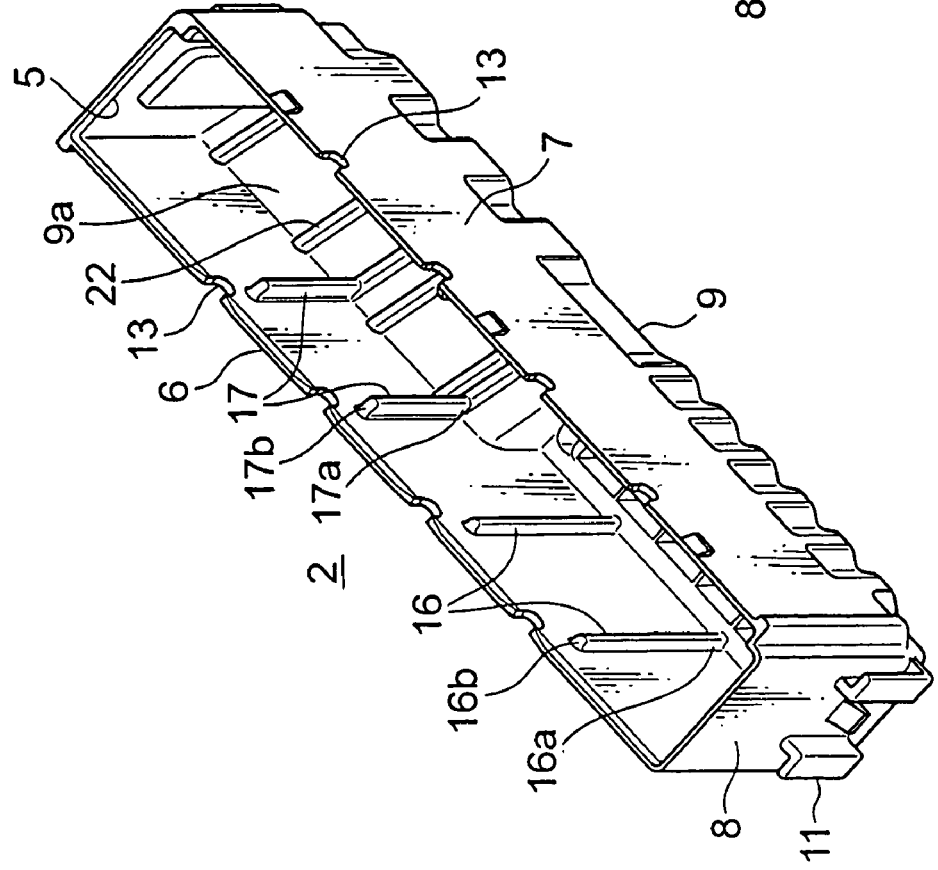

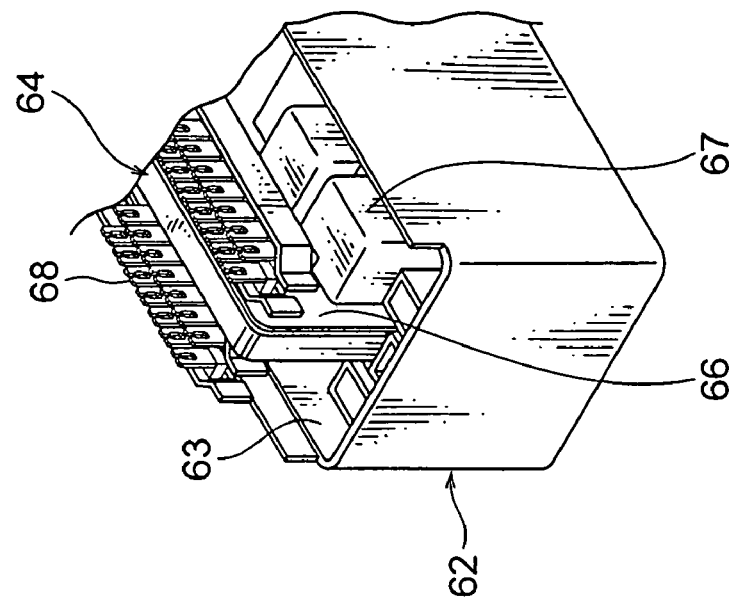
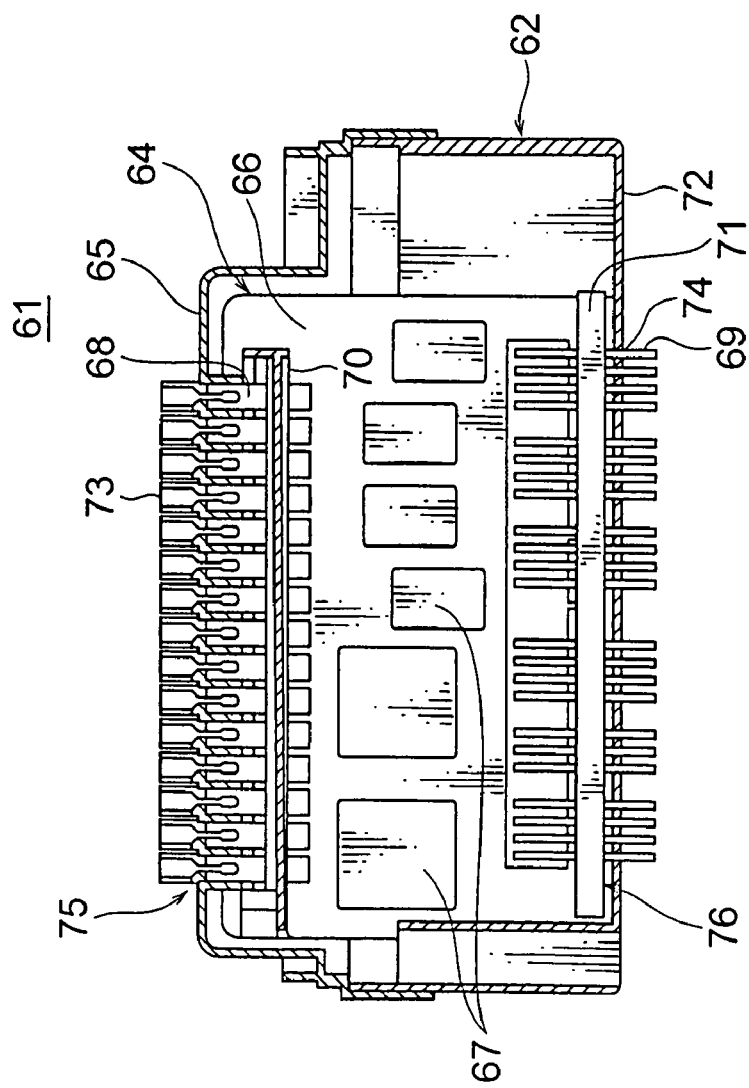

ELECTRICAL JUNCTION BOX

CROSS REFERENCE TO RELATED APPLICATION

The priority application Japan Patent Application No. 2007-140327 upon which this patent application is based is hereby incorporated by reference.

This application is related to co-pending applications: "ELECTRIC JUNCTION BOX" filed even date herewith in the name of Masaoki YOSHIDA et al. which claims priority under 35 U.S.C. §1.119 from Japanese Patent Application No. 2007-140328; and "ELECTRIC JUNCTION BOX" filed even date herewith in the name of Masaoki YOSHIDA et al. which claims priority under 35 U.S.C. §1.119 from Japanese Patent Application No. 2007-140329, which applications are assigned to the assignee of the present application and are incorporated by reference herein.

BACKGROUND OF THE INVENTION (1) Field of the Invention

The present invention relates generally to an electrical junction box, and, in particular, to an electrical junction box which has a primary housing and a secondary housing and is obtained by accommodating a circuit board assembly and other components inside of the primary housing, and then inserting the secondary housing into the primary housing.

(2) Description of the Related Art

A conventional electrical junction box is illustrated in FIGS. 6A and 6B. The electrical junction box 61 has a (a) low-profile primary housing 62, (b) a circuit board assembly 64, and (c) an upper cover 65 (i.e., the secondary housing).

The primary housing 64 has a low profile and is made of a synthetic resin. The circuit board assembly 64 is configured to be inserted in a vertical direction into the primary housing 62 via an opening 63 of the primary housing 62 so as to be accommodated thereinside. The opening 63 of the primary housing 62 opens on an upper side of the primary housing 62. The upper cover 65 is made of synthetic resin and configured to cover the opening 63 of the primary housing 62.

Terminals 68 are provided in two or more rows on an upper end of a circuit board 66. Also, terminals 69 are provided in two or more rows on a lower end of the circuit board 66. The terminals 68 extend upwardly while the terminals 69 extend downwardly.

Bodies 70 and 71 of a connector block are made of synthetic resin and adapted to align and secure the terminals 68 and 69, respectively. A plurality of relays (electrical components) 67 are found in an intermediate region of the circuit board 66.

Mounting members 73 are provided on an upper wall of the upper cover 65 adapted to allow the terminals 68 to protrude. Holes 74 are formed on a bottom wall 72 of the primary housing 62, likewise allowing the terminals 69 to protrude. A connector block 75 includes the terminals 68 and the body 70 while another connector block 76 includes the terminals 69 and the body 76. Each of electric fuses (not shown) is attached to the corresponding mounting member 73 and connected to the corresponding terminal 68 of the connector block 75. For details, refer to the description and, in particular, FIGS. 1 and 2 of Japanese Patent Application Laid-Open Publication No. 2003-348732.

The description and, in particular, FIGS. 1 to 3 of Japanese Patent Application Laid-Open Publication No. 2004-328842 discloses another type of the conventional electrical junction box (not shown). The electrical junction box of this type has the primary housing that is thinner and taller than that of the prior art shown in FIG. 6. This primary housing has openings on upper and bottom sides of the primary housing. Via these upper and lower openings, a bus bar circuit, an insulating plate, and terminals for electric fuse connection are mounted inside of the primary housing. The upper opening is covered by a fuse mounting part (i.e., the secondary housing) made of synthetic resin.

These existing electrical junction boxes need improvement. For instance, when the primary housing 62 made of synthetic resin is formed thin and tall so as to be mounted in a narrow space inside of an automobile, the wall of the primary housing 62 may warp inwardly. Such inward warpage of the wall of the primary housing 62 causes the opening 63 to be narrowed and restricted, making it difficult to mount the circuit board assembly 64, the secondary housing 65 and/or other components inside of the primary housing 62. In addition, when mounting the circuit board assembly 64, the wall of the primary housing 62 might be pressed inwardly from without. The inwardly pressed wall may interfere with the terminals 68, 69 and/or other components of the circuit board assembly 64 (e.g., the relay 67 and a resistor), in some cases deteriorating solder connection thereof. In particular, when the opening of the primary housing is only provided on either of the upper and lower walls thereof, insertion and/or mounting of the circuit board assembly inside of the primary housing is further deteriorated.

SUMMARY OF THE INVENTION

In view of the above, the purpose of the present invention is to provide an electrical junction box which includes a primary housing having a thin, tall profile that can accommodate thereinside a circuit board assembly along with a secondary housing with ease, efficiency, and smoothness, and prevent primary housing walls pressed inwardly in its thickness direction from interfering with a circuit board and/or other components inside of the primary housing.

In order to attain the above objectives, the electrical junction box of the present invention includes (a) a primary housing having an opening, (b) a circuit board assembly having a connector block and being inserted into the primary housing via the opening, (c) a projection provided on the connector block and configured to maintain a width of the opening, and (d) a secondary housing that is inserted into the primary housing after insertion of the circuit board assembly.

The construction and arrangement described above, since the projection of the connector block outwardly widens the opening and front and rear walls of the thin, tall primary housing susceptible to inward warpage, achieves smooth insertion of circuit board assembly even if the opening is narrowed when the connector block protruding from the circuit board enters the opening of the primary housing. Furthermore, since the width of the opening is maintained or widened, insertion of the secondary housing following the insertion of the circuit board assembly can be made with efficiency and smoothness but without interference with the wall of the primary housing. Thus, assembling of the thin-profile electrical junction box is improved.

Preferably, the electrical junction box of the present invention includes the projection that has a sloping surface that is slidably in contact with an end of the opening of the primary housing.

Since the sloping surface of the projection is slidably in contact with the end of the opening with low friction as the connector block enters the primary housing, smooth widening of the opening is achieved, and thus the advantages of the present invention will be further enjoyed.

Preferably, the electrical junction box of the present invention further includes a plurality of ribs. The ribs are formed on an inner surface of front and rear walls of the primary housing, extending from the side of the opening in an insertion direction of the circuit board assembly and the secondary housing.

The ribs structurally strengthen the walls of the primary housing, and the walls are protected against inward warpage during or after resin molding, and the opening can be kept wide open. In addition, a degree of widening of the opening is reduced. It is preferable that the ribs extends and reaches the wall of the opposite side with respect to the opening.

Further, the electrical junction box of the present invention preferably includes a concave groove formed between a pair of the projections, and the rib of either of the front and rear walls is brought into engagement with the concave groove.

The above construction and arrangement increases the structural strength of the entire walls by virtue of the ribs. When the primary housing is pressed inwardly by an external force caused by an operator or external components, the rib abuts against the bottom surface of the concave groove so as to resist the external force acting upon the wall and thereby to prevent inward deformation of the walls. Thus, the interference of the wall with the circuit board assembly and/or electrical components such as a relay of the circuit board assembly is effectively prevented and electrical connection of the circuit board assembly is made more reliable. In addition, the circuit board assembly is guided by the rib, and inserted smoothly into the primary housing without being shaky. Thus, the efficiency in the assembling of the electrical junction box is improved.

Preferably, the electrical junction box of the present invention further includes the rib 19 of the other of the wall 7 coming close to the circuit board 20 of the circuit board assembly, and the connector block having a protuberance that abuts against the rib.

According to the above construction and arrangement, even when the operator forcefully presses the primary housing or when the primary housing interferes with external components, the rib abuts the protuberance of the connector block so as to prevent the interference of the primary housing with the circuit board. In addition, any damage to the solder connection part of the circuit board is prevented or mitigated, and the electrical connection of the circuit board assembly is made more reliable. Further, by providing the circuit board near the primary housing, manufacturing of the low-profile electrical junction boxes will be further advanced.

Preferably, the electrical junction box of the present invention includes a protruding portion and recessed portion that abut upon each other. One of the protruding portion and the recessed portion is provided on the periphery of the opening of the primary housing and the other on the secondary housing.

In the above construction and arrangement, when inserting the secondary housing into the primary housing, engagement between the protruding portion and the recessed portion ensures accurate positioning of the secondary housing with respect to the primary housing. At the same time, the terminals of the connector block are inserted with accuracy into the corresponding terminal insertion holes of the secondary housing. Thus, higher efficiency in manufacturing and more reliable electrical connection of the electrical junction box are achieved. It is preferable that the secondary housing is secured to the primary housing not only by the engagement of the protruding portion with the recessed portion but also by a locking unit in accordance with design requirements.

BRIEF DESCRIPTION OF THE DRAWINGS

These and other objects, features, and advantages of the present invention will become more apparent upon reading of the following detailed description along with the accompanied drawings, in which:

FIG. 2A is a perspective view of the primary housing of the electrical junction box of FIG. 1 viewed from its front side.

FIG. 2B is a perspective view of the primary housing of the electrical junction box of FIG. 1 viewed from its rear side.

FIG. 6A is a vertical cross-sectional view of a conventional electrical junction box.

FIG. 6B is a perspective view of the conventional electrical junction box of FIG. 6A.

DESCRIPTION OF THE PREFERRED EMBODIMENT

FIGS. 1 to 5 illustrate one embodiment of the electrical junction box according to the present invention.

Figure 1:
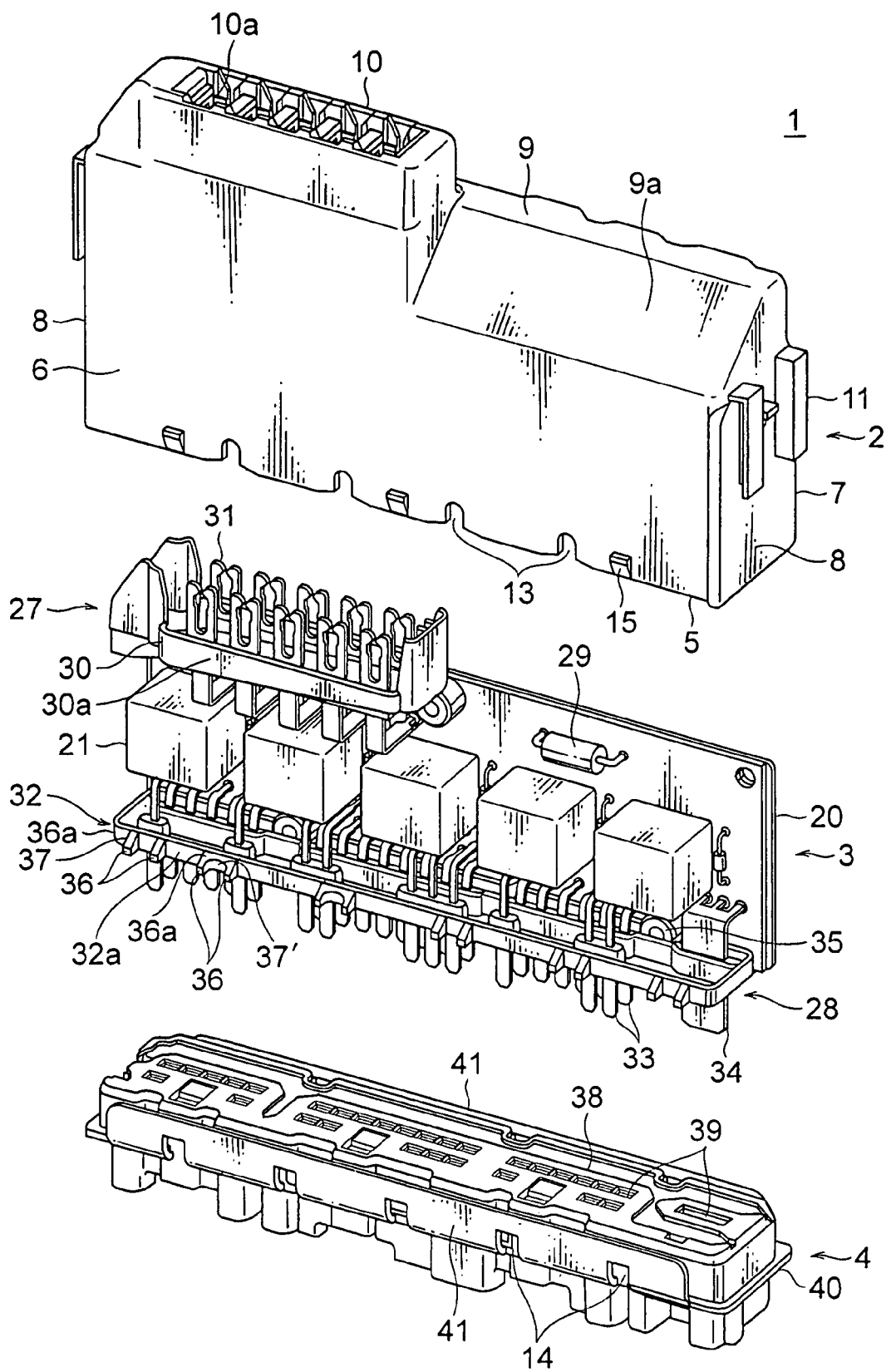
FIG. 1 is an exploded perspective view of an electrical junction box according to one embodiment of the present invention.

The electrical junction box 1 illustrated in FIG. 1 is made of synthetic resin and has a tall, thin profile. The electrical junction box 1 has (a) a primary housing 2 (or casing) having an opening 5 only on its bottom side (see FIG. 2), (b) a circuit board assembly 3 that is inserted into the primary housing 2 via the opening 5 of the primary housing 2, and (c) a secondary housing 4. The secondary housing 4 covers the opening 5 and supports the circuit board assembly 3. An upper half of the secondary housing 4 is mounted, following insertion of the circuit board assembly 3, inside of the primary housing 2 via the opening 5 thereof.

The primary housing 2 has a front wall 6, a rear wall 7, side walls 8 (i.e., right and left walls), and an upper wall 9, the opening 5, and an accommodation space being surrounded with these walls 6 to 9 and communicating with the opening 5.

An electric fuse mounting part (i.e., a region for mounting components) 10 having cavities 10a is integrally formed with a left half of the upper wall 9. A locking portion 11 is provided on each of the side walls 8. The locking portion 11 is used to secure the electrical junction box 1 for example with a vehicle panel.

A cutout groove (recessed portion) 13 and a locking projection 15 are formed side by side at a periphery of the opening 5, i.e., at lower ends of the front and rear walls 6 and 7. The cutout groove (recessed portion) 13 is brought into engagement with a protruding portion 12 (see FIG. 5) of the secondary housing 4. The locking projection 15 is brought into engagement with a cutout hole 14 of the secondary housing 4. It should be noted that the adjectives indicating direction or orientation such as upper, lower, right, left, front, and rear, are used in this embodiment for the sake of simplicity and clarity of the description. None of them should be regarded as being associated with a specific and particular direction in which assembling of the electrical junction box takes place.

Referring to FIGS. 2A and 2B, a plurality of perpendicularly extending ribs 16 to 19 are provided in parallel to each other on an inner surface of the front wall 6 and rear wall 7 of the primary housing 2. The ribs 16 to 19 are arranged widthwise of the front wall 6 and rear wall 7. The ribs 16 to 19 may take different degree of protrusion and various geometries such as a stepped shape according to design requirements and depending upon where the rib is provided. A top end of each of the ribs 16 to 19 (only top end portions 16a and 17a appear in FIG. 1) are formed on and integrally with an inner surface of the upper wall 9. By virtue of these ribs 16 to 19, the front and rear walls 6 and 7 can be made structurally robust, and thus protecting the primary housing 2 from inward warpage deformation occurring immediately after resin molding. Thus, the circuit board assembly 3, the secondary housing 4, and/or other components can be mounted via the opening 5 of the primary housing 2 without interference of the walls of the primary housing 2.

Still referring to FIGS. 2A and 2B, when the circuit board assembly 3 is inserted into the primary housing 2, the ribs 16 and 17 of the primary housing 2 will be positioned proximate to a relay 21 of the circuit board assembly 3 (see FIG. 1), while the ribs 18 and 19 will be positioned proximate to a backside of the circuit board 20. Lower ends 16b and 17b of the ribs 16 and 17 on the front wall 6 in FIG. 2A (i.e., end portions close to a bottom side in FIG. 1) do not reach the periphery of the opening 5 of the primary housing 2. Lower ends 18b and 19b of the ribs 18 and 19 on the rear wall 7 in FIG. 2B form a sloping surface that continues to the periphery of the opening 5. A rib 22 protrudes on an inner surface of a sloping upper wall 9a of FIG. 2A. The rib 17 on an inner surface of the front wall 6 is formed continuous to the rib 22 of the upper wall 9a. By virtue of the ribs 16 to 19 and 22, the primary housing 2 is effectively protected against warpage or deformation caused by collapse of the primary housing 2.

As illustrated in FIG. 2B, prominent portions 23 and 24 are provided between the rib 18 and the rib 19, and on an upper region of the rear wall 7 of the primary housing 2. Widths of the prominent portions 23 and 24 are equal to or smaller than those of the ribs 18 and 19. The prominent portions 23 and 24 protrude inwardly from the rear wall 7. Some of the ribs 18, 19 may be reinforced by being formed integrally with the prominent portion 23 and/or the prominent portion 24 so as to protect the wall 7 against warpage. A pair of prominent portions 25 are provided on an inner surface of the side wall 8 near the rear wall 7. The prominent portions 25 form a vertical guiding groove 26 for inserting the circuit board 20 (see FIG. 1).

Referring to FIG. 1, the circuit board assembly 3 has (a) an upstanding circuit board 20; (b) a fuse connector block 27 connected to an upper region of a left half of the circuit board 20, and provided on a substrate surface; (c) a plurality of relays (electrical components) 21 connected to an intermediate region in a height direction of the circuit board 20, and provided in parallel with each other on the substrate surface; (d) a connector block 28 connected to a lower portion of the circuit board 20, and disposed on a side of the substrate surface; (e) a resistor (electrical component) 29 connected to a surface of the circuit board 20, and (f) other components.

The fuse connector block 27 includes a body 30 made of insulating resin, and a plurality of clamp terminals 31 for connection of a fuse passing through the body 30 from outside into the accommodation space of the primary housing 2.

The connector block 28 has a body 32 made of insulating resin and a plurality of tab terminals 33 and 34 downwardly passing through the body 32. The thicker tab terminal 34 is for electric power supply while the thinner tab terminal 33 is an output terminal. The tab terminals 33 and 34 are inserted into the secondary housing 4. As an alternative, the terminal part may be positioned in a cavity of the primary housing 2 for use in mounting of components.

The body 32 of the connector block 28 is a wall disposed horizontally across a full width of the circuit board 20, screwed onto the circuit board 20 by a boss 35, and configured to protrude orthogonally on the surface of the circuit board 20 toward a proximal side in FIG. 1. Each of the tab terminals 33 and 34 is curved in an L-shape. An end of each of the tab terminals 33 and 34 protrudes downwardly from the body 32 of the connector block body 28, and the other end passes through the circuit board 20 so as to be soldered and connected to a printed circuit and/or other electrical components (see FIG. 3B). The circuit board 20 has the insulating substrate made of synthetic resin and the printed circuit (not shown) formed according to a prescribed pattern upon a surface of or inside of the insulating substrate, along with other circuits such as a bas bar (not shown).

A plurality of a pair of projections 36 are provided at regular pitches on a surface 32a of a front end of the body 32 of the connector block 28. The projections 36 are configured to slidably contact the inner surface of the front wall 6 of the primary housing 2. A concave groove 37 is formed between the pair of projection 36. The concave groove 37 engages with each of the ribs 16 and 17 (see FIG. 2A). The projection 36 has a sloping surface 36a on an upper side of the projection 36.

A depth of the concave groove 37 can be made large or small depending upon a thickness of the protruding ribs 16 and 17. The deep concave groove 37 has a bottom surface (indicated by 37) on the same plane as the outer surface 32a of the body 32 of the connector block 28. A shallow concave groove 37' has a bottom portion (indicated by 37') formed between and continuous to the pair of the projections 36. Also, the bottom wall protrudes from the outer surface 32a of the body 32 of the connector block 28. The bottom portion 37' forms the sloping surface 36a continuous to the projections 36.

Figure 3A:
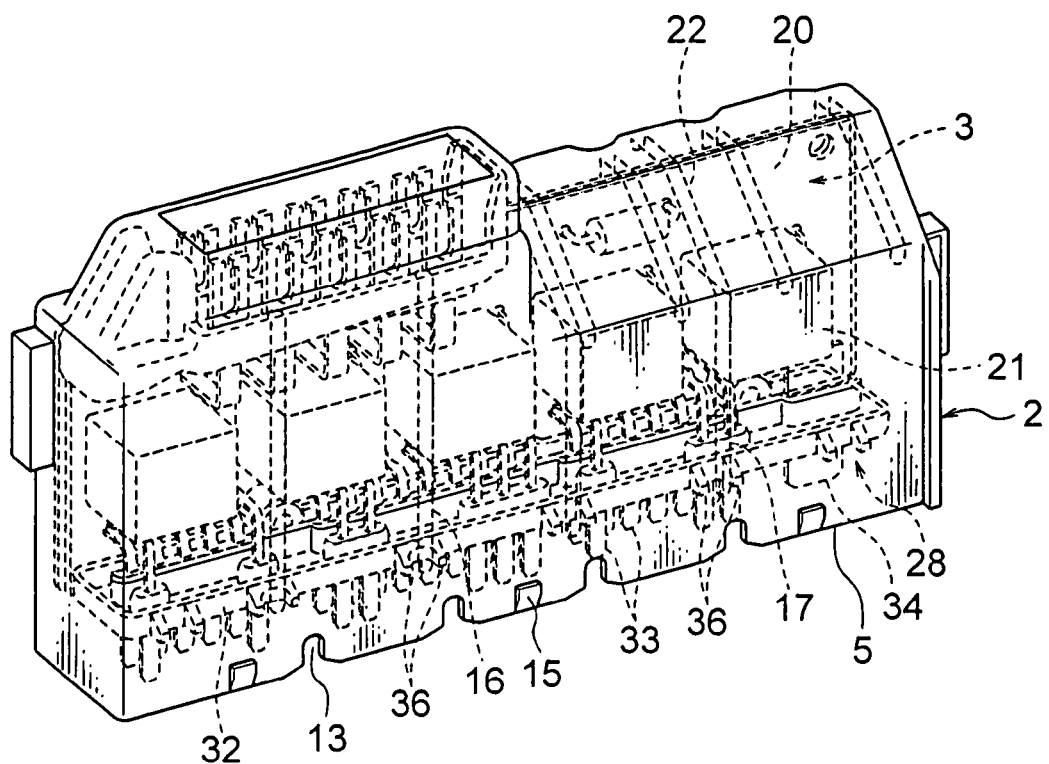
FIG. 3A is a perspective view illustrating a circuit board assembly that has been inserted into the primary housing of FIG. 1.
Figure 3B:
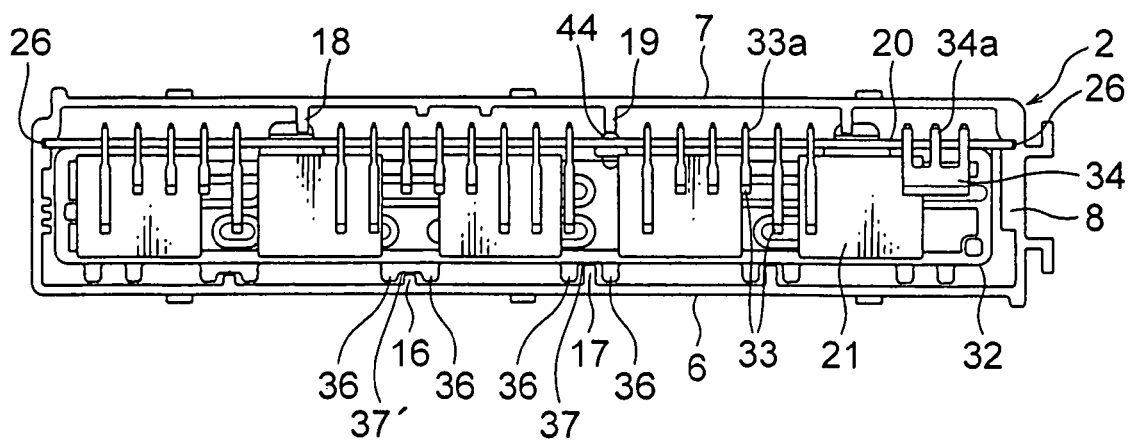
FIG. 3B is a plan view (bottom view) illustrating the circuit board assembly of FIG. 3A.

Referring to FIGS. 3A and 3B, when inserting the circuit board assembly 3 into the primary housing 2, the sloping surface 36a smoothly and slidably contact the lower end of the primary housing 2 (i.e., the periphery of the opening 5), and the projection 36 enters the opening 5. Even if the front and rear walls 6 and 7 of the primary housing 2 warp inwardly, the walls 6 and 7 are forcedly pushed back. Thus, the insertion of the connector block 4 into the primary housing 2 is made smooth with the opening 5 widened, and the subsequent insertion of the secondary housing 4 can also be made smoothly without interference of the periphery of the opening 5 (indicated by the same reference sign 5). If there is no warpage of the walls 6 or 7 of the primary housing 2, the projection 36 will hardly be in contact with the end of the opening 5 or the inner surface of the walls 6 and 7. It is also possible that the projection 36 enters the opening 5 only with loose contact with the walls 6 and 7.

As the lower ends of the ribs 16 and 17 enter the concave grooves 37 and 37' so as to be brought into and kept in engagement with the concave grooves 37 and 37', the circuit board assembly 3 is mounted with smoothness and accuracy. Even if, after mounting of the circuit board assembly 3, the front wall 6 of the primary housing 2 interferes with outer portions, or even if the walls 6 and 7 are pressed in a thickness direction of the walls 6 and 7 for example by an operator's hand (i.e., even if an intermediate region or the upper region of the walls 6 and 7 is pressed instead of a lower region of the walls 6 and 7 where the body 32 of the connector block 28 exists), the ribs 16 and 17 abut upon the bottom surface of the concave grooves 37 and 37', and thus the inward deformation of the front wall 6 is prevented.

Although the ribs 16 and 17 extend linearly across the entire height of the front wall 6, only part of the entire height of the ribs 16 and 17 (for example, the lower end of the ribs 16 and 17) abuts the bottom surfaces of the concave grooves 37 and 37'. Nevertheless, this abutment helps strengthen the entire front wall 6 so as to prevent the front wall 6 from deformation and warpage.

Figure 4:
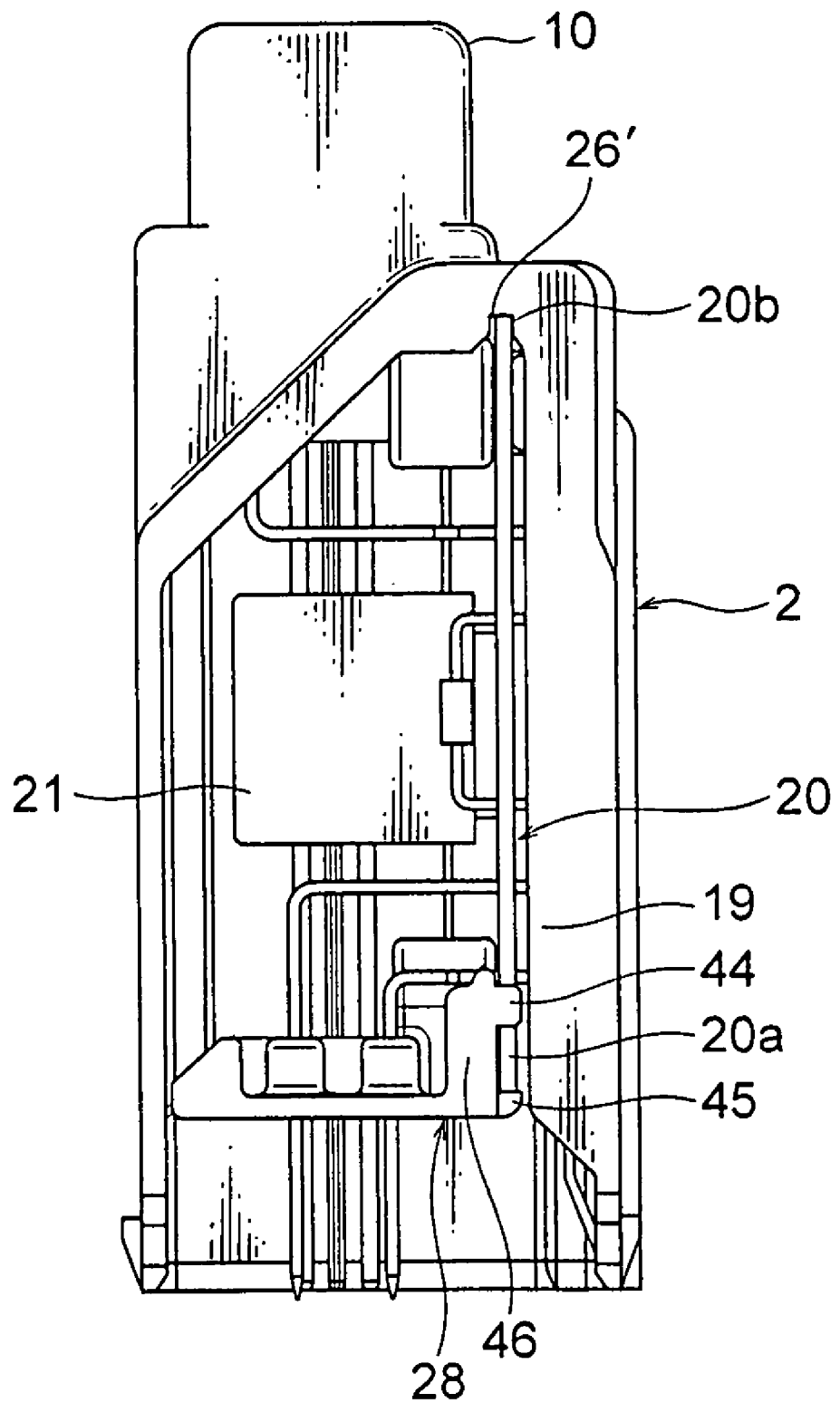
FIG. 4 is a side view illustrating the inner structure of the electrical junction box of FIG. 1.

Referring to FIG. 3B, the ribs 18 and 19 of FIG. 2B are positioned proximate to each other on the backside of the circuit board 20. Referring to FIG. 4, a boss 44 (protuberance) and a brim portion 45 (protuberance) are provided on the connector block 28 such that the boss 44 and the brim portion 45 protrude from the backside of the circuit board 20, past a clearance between the rib 19 and the backside of the circuit board 20 (the boss 44 and the brim portion 45 may come in direct contact with the rib 19). Even when the rear wall 7 of the primary housing 2 is pressed from outside in the thickness direction, the rib 19 abuts upon both of the boss 44 and brim portion 45 or at least upon the brim portion 45, and crushing deformation of the rear wall 7 is prevented, and, in addition, contact of the circuit board 20 with the ribs 18 and 19 can be avoided, so that the circuit and other components are protected.

Still referring to FIG. 3B, the boss 44 is opposed to the rib 19 and, as illustrated in FIG. 4, the brim portion 45 is disposed horizontally and linearly on the lower end of the connector block 28. The boss 44 is provided on an upper region relative to the rib 45. The lower end portion 20a of the circuit board 20 is retained between the boss 44 and the rib 45. The boss 44 protrudes in a horizontal direction from a short rising wall 46. Referring to FIG. 4, a horizontal groove 26' is provided on an inner surface of the upper wall 9 of the primary housing 2. The groove 26' is continuous to the guiding groove 26 of the side walls 8 in FIG. 3B. An upper end portion 20b of the circuit board 20 is brought into engagement with the groove 26' so as to maintain the correct positioning that has been established.

It is possible to dispense with the boss 44 and the brim portion 45 and to bring the ribs 18 and 19 into abutment with the backside of the insulating substrate having no components such as the circuit board 20. By virtue of the boss 44, brim portion 45, and the ribs 18 and 19, the rear wall 7 does not interfere with a solder connection parts 33a and 34a of the terminals 31, 33, and 34 protruding on the backside of the circuit board 20, and the resulting undesirable effect upon the solder connection part 33a and 34a are effectively prevented.

The positions of the ribs 18 and 19 are predetermined to be at a region of the backside of the circuit board 20 where the solder connection part 33a or 34a of the terminals 33 and 34 do not exist. The circuit board 20 can be mounted smoothly without being shaky as the right and left sides of the circuit board 20 are brought into engagement with the guiding groove 26 of the side walls 8 of the primary housing 2.

As shown in FIG. 1, when inserting the circuit board assembly 3 into the primary housing 2, the insertion of the fuse connector block 27 will be facilitated by providing a similar projection 36 upon a front surface 30a of a horizontal wall of the body 30 of the fuse connector block 27 (it is not a prerequisite that the projection 36 engage with the rib 16).

Upon entry of the projection 36 into the primary housing 2, the ribs 16 and 17 on the inner surface of the primary housing 2 engage with the concave groove 37 formed between the projections 36. Referring to FIG. 3A, the connector block body 32 is positioned in an upper side relative to the lower end of the primary housing 2, and the top ends of the tab terminals 33 and 34 protrude downwardly in a space between the lower surface of the body 32 of the connector block 28 and the lower end of the primary housing 2 (i.e., end of the opening 5). The secondary housing 4 is inserted into the lower space of the primary housing 2 via the opening 5. The insertion of the secondary housing 4 is smartly performed with the opening 5 widened by the projection 36.

Referring again to FIG. 1, secondary housing 4 is formed of an insulating synthetic material in a shape of a rectangular block. A plurality of connector-fitting chambers (not shown) are provided inside of the secondary housing 4 and juxtaposed to each other. The secondary housing 4 has a plurality of terminal insertion holes 39 on an upper wall 38 of the secondary housing 4. Each of the terminal insertion holes 39 communicates with the corresponding connector-fitting chamber. The terminals 33 and 34 in a shape of a tab are inserted into the corresponding terminal insertion holes 39 such that the terminals 33 and 34 protrude in the connector-fitting chamber.

Figure 5A:
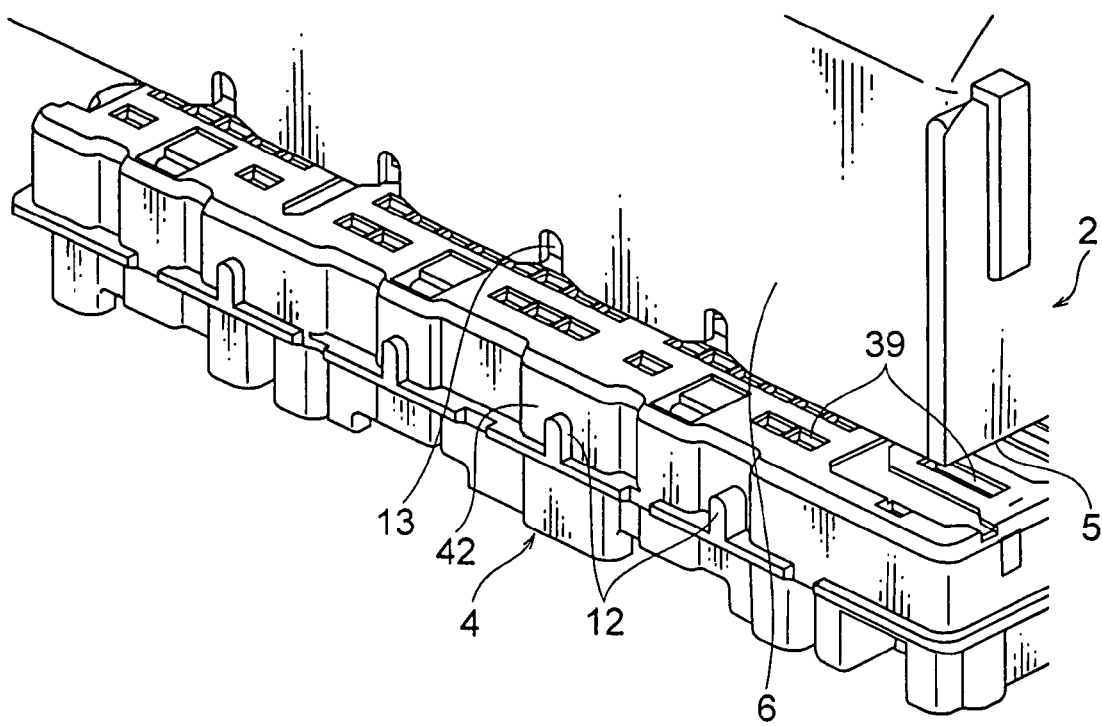
FIG. 5A is a perspective view illustrating the secondary housing being inserted into the primary housing of FIG. 1.

A flange 40 is provided at an intermediate region of the secondary housing 4 in its thickness direction. Front and rear outer walls 41 are perpendicularly provided from the flange 40. The cutout hole 14, which is provided from the outer wall 41 toward the flange 40, is configured to engage with the locking projection 15 of the primary housing 2. Referring to FIG. 5A, the protruding portion 12 in a shape of a short rib is integrally formed inside of the outer wall 41 from the flange 40 toward front and rear inner walls 42 of the secondary housing 4.

Figure 5B:
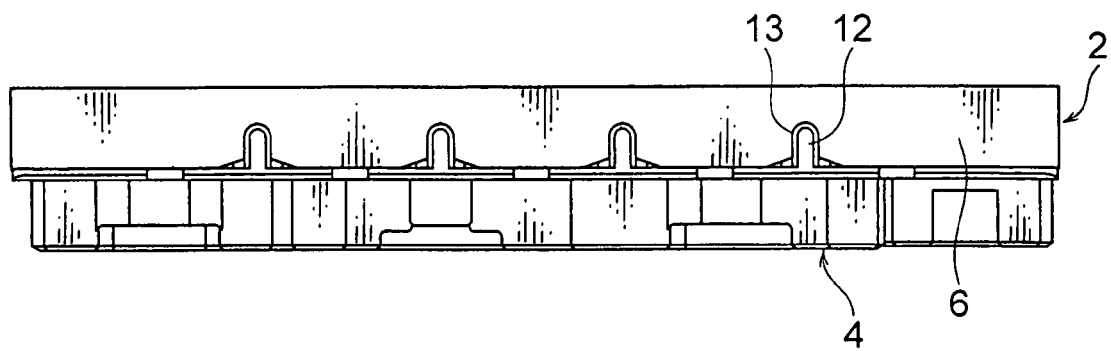
FIG. 5B is a front view of the secondary housing of FIG. 5A.

Referring to FIG. 5B, when the secondary housing 4 is inserted into the opening 5 of the primary housing 2, the protruding portion 12 enters the cutout groove 13 of the primary housing 2 to be brought into engagement with the cutout groove 13, and is positioned without being shaky. Also, the locking projection 15 (see FIG. 1) is brought into smooth engagement with the cutout hole 14. The outer wall 41 is positioned along the outer surface of the front and rear walls 6 and 7 of the primary housing 2. FIG. 5 does not illustrate the outer wall 41 for simplicity.

The inner wall 42 slidably contact the inner surface of the walls 6 and 7 of the primary housing 2. The body 32 of the connector block 28 of the circuit board assembly 3 is supported by the upper wall 38 of the secondary housing 4. Engagement of the protruding portion 12 with the cutout groove 13 allows accurate positioning of the secondary housing 4 with respect to the primary housing 2, and the terminals 33 and 34 of the connector block 28 are inserted into the terminal insertion hole 39 of the secondary housing 4 with accuracy and without interference with the terminal insertion hole 39.

Although the above described embodiment includes the cutout groove 13 provided on the primary housing 2 and the protruding portion 12 on the secondary housing 4, this does not exclude other possibilities of implementation where the protruding portion 12 is provided on the primary housing and the cutout groove 13 on the secondary housing 4.

The above embodiment includes the locking projection 15 provided on the primary housing 2 and the cutout hole 14 on the secondary housing 4. This of course does not exclude the possibility of providing the primary housing 2 having the cutout hole 14 and the secondary housing 4 having the locking projection 15. In this case, construction and arrangement of these locking units 14 and 15 may vary depending upon specific design requirements.

The above embodiment employs the secondary housing 4 covering the opening 5 of the primary housing 2. One may use an upper cover (not shown) covering the upper opening (not shown) of the primary housing 2 as a housing component for the electrical junction box.

Having now fully described the invention, it is clear that the embodiments described above are illustrated as examples of the possible embodiments of the present invention, and that numerous modifications and variations can be effectuated within the spirit and scope of the present invention.

What is claimed is:

1. An electrical junction box comprising:
   a primary housing having an opening;
   a circuit board assembly having a connector block and adapted to be inserted into said primary housing via the opening;
   a projection formed on the connector block so as to maintain a width of said opening; and
   a secondary housing that-is adapted to be inserted into said primary housing after insertion of said circuit board assembly into said primary housing and
   further comprising a plurality of ribs provided on inner surfaces of front and rear walls of said primary housing, said ribs extending from the side of said opening in an insertion direction of said circuit board assembly and said secondary housing, and
   further comprising a concave groove formed between a pair of said projections, and configured to engage with said ribs of the front wall of said primary housing.

2. The electrical junction box of claim 1, wherein said projection has a sloping surface that slidingly contacts an end of said opening.

3. The electrical junction box of claim 2, further comprising a plurality of ribs provided on inner surfaces of front and rear walls of said primary housing, said ribs extending from the side of said opening in an insertion direction of said circuit board assembly and said secondary housing.

4. The electrical junction box of claim 3, further comprising a concave groove formed between a pair of said projections, and configured to engage with said ribs of the front wall of said primary housing.

5. The electrical junction box of claim 1, wherein said rib of the rear wall of said primary housing is positioned close to a circuit board of said circuit board assembly, and the connector block has a protuberance that abuts against said ribs of the rear wall of said primary housing.

6. The electrical junction box of claim 3, wherein said rib of the rear wall of said primary housing is positioned close to a circuit board of said circuit board assembly, and the connector block has a protuberance that abuts against said ribs of the rear wall of said primary housing.

7. The electrical junction box of claim 1, wherein said rib of the rear wall of said primary housing is positioned close to a circuit board of said circuit board assembly, and the connector block has a protuberance that abuts against said ribs of the rear wall of said primary housing.

8. The electrical junction box of claim 4, wherein said rib of the rear wall of said primary housing is positioned close to a circuit board of said circuit board assembly, and the connector block has a protuberance that abuts against said ribs of the rear wall of said primary housing.

9. The electrical junction box of claim 1, wherein one of a protruding portion and a recessed portion is provided at an end of said opening of said primary housing, the other of said protruding portion and said recessed portion is provided on said secondary housing, and said protruding portion and said recessed portion engage with each other.

10. The electrical junction box of claim 2, wherein one of a protruding portion and a recessed portion is provided at an end of said opening of said primary housing, the other of said protruding portion and said recessed portion is provided on said secondary housing, and said protruding portion and said recessed portion engage with each other.

11. The electrical junction box of claim 1, wherein one of a protruding portion and a recessed portion is provided at an end of said opening of said primary housing, the other of said protruding portion and said recessed portion is provided on said secondary housing, and said protruding portion and said recessed portion engage with each other.

12. The electrical junction box of claim 3, wherein one of a protruding portion and a recessed portion is provided at an end of said opening of said primary housing, the other of said protruding portion and said recessed portion is provided on said secondary housing, and said protruding portion and said recessed portion engage with each other.

13. The electrical junction box of claim 1, wherein one of a protruding portion and a recessed portion is provided at an end of said opening of said primary housing, the other of said protruding portion and said recessed portion is provided on said secondary housing, and said protruding portion and said recessed portion engage with each other.

14. The electrical junction box of claim 4, wherein one of a protruding portion and a recessed portion is provided at an end of said opening of said primary housing, the other of said protruding portion and said recessed portion is provided on said secondary housing, and said protruding portion and said recessed portion engage with each other.

15. The electrical junction box of claim 5, wherein one of a protruding portion and a recessed portion is provided at an end of said opening of said primary housing, the other of said protruding portion and said recessed portion is provided on said secondary housing, and said protruding portion and said recessed portion engage with each other.

16. The electrical junction box of claim 6, wherein one of a protruding portion and a recessed portion is provided at an end of said opening of said primary housing, the other of said protruding portion and said recessed portion is provided on said secondary housing, and said protruding portion and said recessed portion engage with each other.

17. The electrical junction box of claim 7, wherein one of a protruding portion and a recessed portion is provided at an end of said opening of said primary housing, the other of said protruding portion and said recessed portion is provided on said secondary housing, and said protruding portion and said recessed portion engage with each other.

18. The electrical junction box of claim 8, wherein one of a protruding portion and a recessed portion is provided at an end of said opening of said primary housing, the other of said protruding portion and said recessed portion is provided on said secondary housing, and said protruding portion and said recessed portion engage with each other.

* * * * *